United States Patent [19]

Othmer

[11] 3,861,904
[45] Jan. 21, 1975

[54] METHOD FOR PRODUCING ALUMINUM METAL DIRECTLY FROM ORE

[76] Inventor: Donald F. Othmer, 333 Jay St., Brooklyn, N.Y. 11201

[22] Filed: June 15, 1973

[21] Appl. No.: 370,310

Related U.S. Application Data

[63] Continuation-in-part of Ser. Nos. 103,765, Jan. 4, 1971, Pat. No. 3,793,003, and Ser. No. 308,059, Nov. 20, 1972.

[52] U.S. Cl. ................ 75/68 R, 75/68 B, 423/469, 423/495, 423/565
[51] Int. Cl. ............................................ C22b 21/04
[58] Field of Search ............. 75/68 R, 68 AB, 68 B; 423/495, 469, 565

[56] References Cited
UNITED STATES PATENTS

| 410,568 | 9/1889 | Wanner | 75/68 R |
|---|---|---|---|
| 2,400,000 | 5/1946 | Gardner | 75/68 A |
| 2,904,398 | 9/1959 | Smith | 423/263 |

OTHER PUBLICATIONS
Mellor Treatise on Chemistry Vol. 5 p. 314 lines 18 to 21 relied on, 1930, QD 31 M4

*Primary Examiner*—L. Dewayne Rutledge
*Assistant Examiner*—M. J. Andrews

[57] ABSTRACT

Aluminum may be separated from ores through the halogenation by a sulfur halide of the alumina therein to a trihalide, and/or a monohalide. The monohalide may be disproportioned by instantaneous cooling to give aluminum metal and aluminum trihalide in a "flash" condenser using as the coolant aluminum-trihalide, sometimes in a mixed salt or solution with the chloride of another metal and sometimes under superatmospheric pressure. Aluminum trihalide may be formed, not only by this disproportioning, but also by an original halogenation which may be done by an elemental halide or by the sulfur halide, either alone or in the presence of either oxygen or a solid reductant. The aluminum trihalide, however formed, may also be reacted with sulfur, preferably under superatmospheric pressure, to give aluminum metal and a sulfur halide, which may be recycled to halogenate more aluminous ore. Any aluminum sulfide produced by the action of sulfur on aluminum or alumina may be reacted with metallic iron to give aluminum and an iron sulfide which may be reduced to iron for recycle.

28 Claims, No Drawings

METHOD FOR PRODUCING ALUMINUM METAL DIRECTLY FROM ORE

This application is a Continuation in Part of co-pending Applications U.S. Ser. of No. 103,765 of Jan. 4th, 1971 now U.S. Pat. No. 3,793,003 and 308,059 of Nov. 20th, 1972, both having this same title, and both referred to hereinafter as the co-pending applications.

Aluminum halides may be produced through the attack on alumina in ores and ore residues by the three lower halogens — particularly chlorine — although fluorine and bromine are used desirably in some cases. Then these halides formed of aluminum and other metals are separated; and either the monohalides or the trihalides are reacted with sulfur to give aluminum metal and a sulfur halide which often may be used as the original halogenating agent for the original aluminous material.

Chlorine, chlorination, and chlorides are referred to hereinafter as examples; however, bromine, bromination and bromides, also fluorine, fluorination and fluorides must be considered as also useful in many cases, each with certain advantages and disadvantages which must be evaluated to obtain the optimum results of the invention.

While definite chemical equations are given as the possible mechanism for each of the several reactions, it must be understood that these may not be the exact, or even the only, reactions involved, since particularly sulfur, but also aluminum, have various valences; and the molecules and their number as written in a particular equation, may actually differ under differing conditions. Also, a chemical equation may represent only one of, or the sum of, several reactions which actually take place. Particularly the equation of a reaction is only the assumed chemical mechanism which may be involved and which may be difficult or impossible to prove as the exact chemical route in obtaining the resulting end product. Also, as in the case of the several sulfur halides, the reaction for only one may be indicated, while the comparable reactions of others are taking place at the same time.

Furthermore, the prior art, and particularly that of the aluminous ores and other raw materials which are useful in this invention, are the same as discussed in the co-pending applications.

OBJECTS AND ACCOMPLISHMENTS OF THE INVENTION

Some objects and accomplishments of the invention are: - a. the winning of aluminum from otherwise recalcitrant materials;
b. the production of aluminum without large costs for chemical reagents and electric power;
c. the use of sulfur halides to attack the ore and to give compounds which may be separated from each other and from aluminum;
d. the production of an aluminum monohalide using a sulfur halide and the disproportionment of the monohalide to aluminum and the trihalide in a flash condenser using aluminum trihalide as a liquid coolant;
e. the reduction of an aluminum halide to aluminum by sulfur;
f. the halogenation of aluminum by a sulfur halide, alone or in the presence of coke or oxygen;
g. the recovery and recycling of both sulfur and halogen in a closed system, either as elements or as compounds, with minimal use and loss.
h. the recovery of aluminum metal by reducing aluminum sulfide, produced from aluminum or alumina, with metallic iron.

OPERATION OF THE INVENTION

When a gas stream containing AlCl and CO which were formed by a high temperature reduction-chlorination of $Al_2O_3$ or otherwise is very rapidly chilled, aluminum metal is formed together with $AlCl_3$, and this mechanism is usually assumed in the prior art as:-

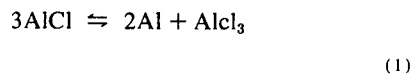

(1)

The reaction goes left to right below 1,000°C, right to left at higher temperatures, particularly above 1,500°C.

Liquids have been found which can quench this gas stream containing AlCl and CO in so short a time, by direct contact in a so-called "flash" condenser, that the reaction of the aluminum formed with CO or other gases present cannot take place. Particularly this quenching must be so rapid that the CO does not react with the newly formed Al metal before the metal becomes a liquid or a solid at a temperature too low for the reaction with CO to take place. The time required to cool the gas phase in this and other quenching or flash condensing operations described hereinafter should be not more than 1 to 5 seconds, and preferably less than 1 second. This quenching operation is more fully described in the co-pending applications.

The co-pending Application No. 308,059 showed that $AlCl_3$ may be used as the liquid coolant when the flash condenser is maintained at a super-atmospheric pressure above the triple point of $AlCl_3$ or when the $AlCl_3$ has mixed with it a chloride of another metal above aluminum in the chlorine affinity series so as to maintain the $AlCl_3$ in the liquid phase. Since it may be impractical to compress the gas stream carrying AlCl from the reaction whereby it is formed, this means that this reaction should be conducted at a pressure at least equal to the vapor pressure of the $AlCl_3$ at the desired temperature in the flash condenser. On the other hand, if the temperature is at or above the triple point of $AlCl_3$ (192.6°C and 2.2 atmospheres), the gases and aluminum formed, which must be at this pressure, are cooled to this temperature; as the aluminum metal freezes and the $AlCl_3$ boils in absorbing these heats of cooling and of solidification.

It has now been found that $AlCl_3$ may be used in a "splash" condenser or other form of the "flash" condenser previously described in the co-pending applications to condense a vapor stream of sulfur wherein a second chemical reaction takes place at the temperature of the condenser, with the $AlCl_3$ present: -

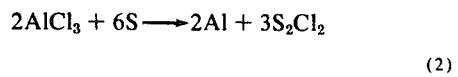

(2)

The boiling point of sulfur is 445°C, which is considerably above the critical temperature of $AlCl_3$; thus, if there is to be maintained a liquid phase in the flash condenser, it is necessary to add a chloride salt of a metal higher than aluminum in the chlorine affinity series which will depress the vapor pressure of $AlCl_3$, or to operate the boiler supplying sulfur vapors at a higher pressure than the flash condenser with a reducing valve in between, or to do both.

It is highly desirable to prevent the reaction of sulfur and Al metal. Thus, there is always a large excess of $AlCl_3$ present which surrounds the particles of Al formed and minimizes the opportunity for such reaction.

The effective boiling point of $AlCl_3$ used as the coolant, and thus the effective temperature of the reaction, may be increased very much (as described in co-pending Application No. 308,059) by the addition to the $AlCl_3$ of a chloride salt of a metal such as, preferably, an alkaline metal, or, in any case, of some other metal, or two or more such metals, each of which is above aluminium in the chlorine affinity series, and which added chloride or chlorides have a higher vaporizing point than that of $AlCl_3$. This added chloride or chlorides may be in an amount of from 5 to 95 percent of the total liquid phase in the flash condenser.

The Al metal may be removed as a solid slurry as described in co-pending Application No. 308,059, since the boiling point of the coolant ($AlCl_3$ alone or mixed with the halide of another metal) is usually well below the melting point of Al at 660°C. However, if a high temperature flash condenser is used with its operating conditions controlled to maintain a liquid temperature just above 660°C by the addition to the $AlCl_3$ of sufficient of another chloride salt, liquid Al metal is removed.

The reaction of Equation 2 goes very much more rapidly at a temperature above the melting point of aluminum, 660°C, and this requires the use of a suitable mixture of the metal chlorides acting as coolant. There is also a further reaction in greater or lesser amounts: -

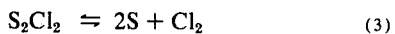

$$S_2Cl_2 \rightleftharpoons 2S + Cl_2 \qquad (3)$$

The reaction of Equation 3 has been found to proceed very much less rapidly left to right if there is a higher than atmospheric pressure in the flash condenser. The sulfur so formed, if the $S_2Cl_2$ is in the liquid phase, immediately reacts with $AlCl_3$ used as the condensing fluid, as by Equation 2.

The chlorine formed by the reaction of Equation 3 is a gas; and it will be discharged immediately from the flash condenser in the gas stream containing the CO and unreacted $S_2Cl_2$, also other gases present in smaller or greater amounts. The chlorine gas is separated from this gas stream by conventional procedures for reuse in the original chlorination to produce $AlCl_3$ from the ore as described in co-pending applications, or for any other use. In some cases, the chlorine in the gas stream with the CO present may be used directly for chlorination of the original ore or otherwise without separation therefrom.

The aluminum metal may be separated from the coolant fluid, $AlCl_3$, alone or mixed with the chloride of another metal, as described in co-pending applications, by washing off with a suitable solvent or distilling off the $AlCl_3$, or by other conventional methods.

As in any such condenser, heat is removed by evaporation of a liquid — here $AlCl_3$ alone or in admixture with another chloride or chlorides — in direct contact with the materials being cooled and condensed. Thus, there must be an auxiliary reflux condenser for the condensation of the vapors formed. The vapors from the $AlCl_3$ evaporated off from the aluminum metal formed are also condensed by this reflux condenser; and the condensate is returned to the pool of the flash condenser.

The $AlCl_3$ may be separately formed in a chlorination at a lower temperature, for use in the reaction of Equation 2. It has now been found that the addition of a carefully controlled amount of a solid reductant, as a coke, and/or particularly oxygen, as such or as air, may improve Equation 2 reduction of $AlCl_3$ by sulfur. In addition to the $S_2Cl_2$, then there will be formed, depending on the relative amounts of these other reactants added, more or less $SO_2$, CO, sulfuryl chloride, and even elemental chlorine; and exact equations depend very much on the exact conditions. If coke and/or oxygen are added, it is usually preferable to conduct this reduction of $AlCl_3$ by sulfur under atmospheric pressure; and reverse reactions may be minimized by minimizing the time of contact through the use of the flash condenser as the reactor.

The reaction of Equation 2 has been found to be helped by conducting it under superatmospheric pressure, and the $AlCl_3$ used can be produced in any one of the many ways known in the art. Thus, the pre-prepared $AlCl_3$ may be charged conveniently to and maintained at a temperature and pressure above its triple point of 192.6°C and 2.2 atmospheres in a simple reactor rather than in the flash condenser. Sulfur is again boiled in a separate vessel to supply vapors at a pressure slightly greater than that in the reactor containing $AlCl_3$. The sulfur vapors are supplied to the reactor at the necessary saturation temperature corresponding to the pressure of the reaction; and they will have to be formed at a temperature above about 500°C, which is the boiling point of sulfur at 2.2 atmospheres, the pressure of the triple point of $AlCl_3$. The sulfur vapors at the higher temperature react with the liquid $AlCl_3$. A control of the reaction can be secured by adding a mixture of liquid and vaporous sulfur; or only liquid sulfur may be added at the necessary pressure, but below the corresponding saturation temperature of sulfur.

The sulfur is added in a fine stream. This gives maximum opportunity for it, in bubble or droplet form, to react with the $AlCl_3$, according to Equation 2. There may be some condensation of the vaporous sulfur before it has time to react. Again, there may be some dissociation of the $S_2Cl_2$ formed to give sulfur and chlorine according to Equation 3. The sulfur so formed becomes a reactant once more, to give more aluminum and more $S_2Cl_2$.

If gaseous sulfur bubbles into the lower part of the reactor, there may be from 1 inch to 5 feet of liquid $AlCl_3$ above the entering sulfur vapors. Any sulfur formed by the dissociation of the $S_2Cl_2$ according to Equation 3 can react again immediately with the $AlCl_3$. The chlorine, however, which is formed, rises as a gas through the liquid $AlCl_3$ to the vapor space which contains $S_2Cl_2$. The aluminum in its own solid phase is surrounded by a large excess of liquid $AlCl_3$ and is substantially out of contact with both the elemental sulfur and chlorine formed; thus has a minimum contact for reaction therewith. The aluminum can be removed as a slurry in the $AlCl_3$ as often as desired to minimize contact time.

The chlorine resulting from the dissociation of the $S_2Cl_2$ may be separated from the remaining $S_2Cl_2$ in a standard rectifying section in the upper part of the reactor. Alternatively, a gas stream may be passed from the reactor to a separate distilling column with a relatively few plates. This may operate at either the higher pressure of the reactor, or at atmospheric pressure, to separate chlorine overhead for reuse as mentioned above and $S_2Cl_2$ for still other uses.

The aluminum results as a sludge of fine particles in the liquid. Here the liquid phase will be the $AlCl_3$ which was charged to the reactor. Again, it may be separated from the aluminum by the methods indicated in the co-pending applications. One of the simpler of these methods is to evaporate the $AlCl_3$ away from the aluminum. The vapors are then condensed in a reflux condenser; and the condensate is returned to the reactor. $AlCl_3$ is fed to the reactor in any convenient way as solid, liquid, or gas. If a gaseous feed is used for convenience, it may be condensed in this same reflux condenser; or $AlCl_3$ may be reacted with S, both as gases.

However, the reaction of Equation 2 has been found to proceed at a temperature above the temperature at the triple point of $AlCl_3$. Sulfur has a vapor pressure above 12 atmospheres at the melting point, 660°C, of aluminum metal. The molten condition of aluminum is desirable in its production and separation. However, $AlCl_3$ is above its critical point at this temperature. (The critical temperature of $AlCl_3$ is 355°C, and the critical pressure is 26 atmospheres.)

In order to increase the reaction temperature while still keeping $AlCl_3$ in the liquid phase, a mixture, solution, or mixed salt liquid can be made of the $AlCl_3$ with one or more chlorides of alkaline and alkaline earth metals and other metals which also are higher than aluminum in the chlorine affinity series. These mixtures, as mentioned above and as described in co-pending Application No. 308,059 in relation to their use in a flash condenser, are equally useful in a conventional liquid phase reactor where it is desired to maintain $AlCl_3$ as a liquid (mixed with the other chloride or chlorides) and at temperatures above the melting point of aluminum metal. Particularly the chlorides of the alkaline metals are useful as additives to the $AlCl_3$ for depressing the vapor pressure of $AlCl_3$ because of their relative inertness to sulfur. One or more such metallic chloride may be added in an amount of from 5 to 90 percent of the total liquid phase.

While higher pressures always aid the reaction represented by Equation 2, it may also proceed as a gas phase reaction at atmospheric pressure, but at a higher temperature than when under superatmospheric pressure. The vapors from the gas phase reactor again pass to a flash condenser if it is desired to separate the aluminum from the condensing vapors as indicated above and as described in the co-pending applications. Again, as in other uses of the flash condenser to quench a reaction and prevent side or reverse reactions, it is desirable to cool the products of the reaction in not more than 1 to 5 seconds, and preferably in less than 1 second.

If $S_2Cl_2$ is used as the condensing liquid, the aluminum comes as solid metal. Other liquids with higher melting points — even above that of aluminum — may be used also, as specified in co-pending applications.

If the chlorination of aluminum is under such high temperatures that more or less of the monochloride, AlCl, is also formed, and if the hot gases are then reacted with gaseous sulfur and quickly chilled, the reactions of Equations +1 and 2 may be combined, or a single reaction takes place to give immediately aluminum metal and $S_2Cl_2$.

Now it has been found that, at a temperature between 200°–1500°C a sulfur chloride such as $S_2Cl_2$, reacts with $Al_2O_3$.

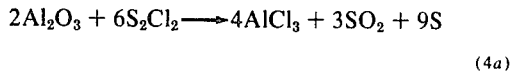

(4a)

or, if in the presence of a solid reductant, as coke: -

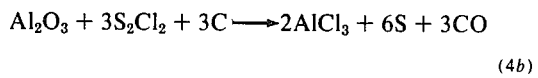

(4b)

or, if oxygen is added: -

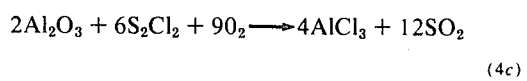

(4c)

As noted above, $S_2Cl_2$ may be formed from the reactions of Equation 2 in the splash condenser, using either $AlCl_3$ or $S_2Cl_2$ as at least part of the coolant liquid, or from Equation 2 in an atmospheric pressure reactor, or in a pressure reactor initially charged with $AlCl_3$ and fed with the vapors of sulfur. This $S_2Cl_2$ so formed in any of these ways may be recycled and reacted with alumina-containing ores or residues of ores, after other operations including prior chlorinations. The reactions of Equations 4(a,b,c) may be accomplished, and $AlCl_3$ is formed. The $AlCl_3$ may be condensed out fractionally; and the $SO_2$ may be used as such for any of its many uses, or it may be recovered by conventional means for reuse as S. The $AlCl_3$ is reused to give aluminum metal by the reaction of Equation 2.

These, as all other steps of this invention, are always fully enclosed to minimize losses and prevent pollution by noxious substances.

In the copending applications, the chlorination, in a reactor in the presence of coke, $Al_2O_3$ with $AlCl_3$ has been demonstrated to give AlCl at high temperatures; and the combination of this reaction with the reaction of Equation 4b gives as a probable mechanism of the results noted at temperatures above 1,500°C: -

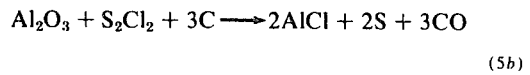

(5b)

Similarly, the use of oxygen gives: -

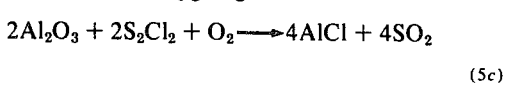

(5c)

Here again, as in co-pending No. 308,059, the gaseous AlCl may be disproportioned to Al metal and $AlCl_3$ by cooling rapidly the gaseous mixture from the high temperature of 1,500°C to 2,200°C to below 1,000°C in not more than 5 seconds, and preferably not more than 1 second. Again, this may be done in the flash condenser using $AlCl_3$ or mixtures of it with chlorides of other metals above aluminum in the chloride affinity series.

The mechanism of these reactions which produce aluminum metal directly are difficult to establish; and it is possible that it may consist of several steps; or the actual chemistry may be even more simple than the two steps indicated by a combination of the reactions of Equations 5b or 5c and Equation 1. However, the result is the reduction-halogenation by a sulfur halide of alumina to give aluminum metal.

Because of the chlorine affinity series, as explained more fully in the copending applications, if the ore-containing alumina used in the reaction of the Equations 4a, 4b, or 4c contains oxides of iron or titanium, either or both will be chlorinated preferentially as compared to the $Al_2O_3$. Thus, iron and titanium may first be separated as their respective volatile chlorides by a preliminary chlorination similar to that of Equations 4a, 4b or 4c, in a reduction chlorination as also explained in the copending applications, using chlorine gas. $S_2Cl_2$ also has been found to be a suitable chlorinating agent for these metals in an ore.

While chlorine has been indicated above as the typical example of the halogens in the process of producing aluminum by this invention, bromine, bromination, and bromides; also fluroine, fluorination, and fluorides have some advantages which must be considered. As noted in the copending Application No. 308,059, $AlBr_3$ with a true boiling point of 265°C has a major advantage in its use in a flash condenser or in a liquid reaction with sulfur as described above, as compared with the sublimation point of $AlCl_3$.

Also, $AlF_3$ and $AlF$ are comparable exactly to the two aluminum chlorides; and $AlF_3$, like $AlCl_3$, sublimes rather than melting — then boiling — as with most liquids. $AlF_3$ can be made by many reactions, including the reduction-fluorination of $Al_2O_3$. However, the vapor pressure at 760 mm (sublimation point) of $AlF_3$ is not reached until 1,272°C, which is also in the temperature range of the disproportioning of the trifluoride to the monofluoride.

The production of $AlF_3$ proceeds by fluorination of $Al_2O_3$ by a sulfur fluoride alone, or in the presence of either a solid reductant or oxygen. Again, the relatively low volatility of $AlF_3$ compared to $AlCl_3$ causes the reaction to proceed better at atmospheric pressure than at a higher pressure, and between 400°–1200°C.

In general, the relatively very much lower vapor pressures of the bromides and the fluorides simplify the process and equipment designs for the large scale operation of the invention; but these advantages must be balanced against the greater cost of bromine and fluorine, and the greater toxicity and corrosiveness to materials of construction of some of their compounds.

Cryolite ($Na_3AlF_6$) is a stable compound of $AlF_3$ and 3NaF and, as such, does not allow the individual reaction of $AlF_3$, as the mixed salt solution of NaCl and $AlCl_3$ allows the reaction of $AlCl_3$. However, cryolite does dissolve an excess of $AlF_3$, a total of 64% $AlF_3$, at a minimum melting point of 693°C, which is somewhat above the melting point of aluminum. Also, it dissolves alumina at these high temperatures. Thus the cryolite may be the solvent for the reaction or part of the coolant liquid for the flash condenser, used as described above. Furthermore, it has been found that, at temperatures above about 700°C, alumina may be fluorinated by a sulfur fluoride such as $SF_6$ in the presence of carbon or other reductant to give aluminum metal, aluminum fluoride, and gases $SO_2$ and CO.

In the reaction of $AlCl_3$ with sulfur, which proceeds best at about 500°–750°C, and also with the chlorides and fluorides of sulfur with alumina, ther may be both elemental sulfur and elemental aluminum present. As described above, it is possible to minimize the physical contact and hence chemical reaction of the sulfur and the aluminum, but some reaction may take place to give aluminum sulfide, $Al_2S_3$, melting at about 1100°C. The aluminum may be melted away from the solid $Al_2S_3$ or they may be reacted together with iron powder at a temperature of 500°–1200°C to give aluminum metal and ferrous, FeS, or ferric sulfide, $Fe_2S_3$, for example:

$$Al_2S_3 + 2Fe \longrightarrow Fe_2S_3 + 2Al$$

(6)

Excess iron will also form a solution or alloy with aluminum, making the end metal products brittle. Thus, the stoichiometric amount of iron powder necessary to combine with $Al_2F_3$ should be used to give substantially pure aluminum metal.

Aluminum sulfide is also formed to some extent from the action on the alumina charge of the sulfur produced in reaction 4B at temperatures above 1,200°C, although the reaction is found to proceed at a temperature as low as 600°C. When alumina by itself or in any ore is reacted at temperatures above 1000°C with sulfur vapors in the presence of a solid reductant such as carbon, $Al_2S_3$ is formed and sublimed, being carried off in the $SO_3$ and CO also formed. Thus: -

$$2Al_2O_3 + 6S + 6C \longrightarrow 2Al_2S_3 + 6CO$$

(7)

The $SO_3$ may be separated and reconverted to sulfur by conventional processes and the $Al_2S_3$ may be converted by treatment with metallic iron to give aluminum metal and iron sulfide, which, in turn, may be reduced to iron by known methods for recycle.

In the use of any of the halogens and the pressure operations with volatile halides, a substantially tight system must be operated; and, except for minor amounts of losses with halides in the by-products due to other metals and/or hydrogen or water present, there is relatively little make up of halogen required as the product aluminum leaves the system as such and not as a halide.

I claim:

1. The process of producing aluminum metal from an aluminum halide by steps comprising:
   a. charging said aluminum halide and elemental sulfur into a reactor;
   b. reacting in said reactor said aluminum halide with said sulfur in a fluid phase to form aluminum metal and a sulfur halide; and
   c. separating said aluminum metal from said sulfur halide and any excess of said reactants.

2. In the process of claim 1, wherein oxygen is added to said reaction.

3. In the process of claim 1, wherein a solid reductant is added to said reaction.

4. In the process of claim 1, wherein said aluminum is separated as a liquid and at least a part of said elemental sulfur is in the liquid phase under an elevated pressure and at a temperature above the melting point of said aluminum.

5. In the process of claim 1 charging an excess of sulfur over that which reacts with said aluminum halide in step (a) and reacting some part of said aluminum produced with said excess sulfur to form aluminum sulfide.

6. In the process of claim 5 further reducing said aluminum fulfide with metallic iron to give aluminum metal and an iron sulfide.

7. In the process of claim 1, wherein said aluminum halide comprises at least one compound of aluminum and fluorine; and said sulfur halide comprises at least one compound of sulfur and fluorine.

8. In the process of claim 7, wherein said aluminum fluoride is, at least in part, aluminum trifluoride; and said sulfur is added as vapors at at least their saturation temperature under the pressure of said reaction.

9. In the process of claim 7, wherein said reaction takes place at least in part, in a liquid phase comprising aluminum trifluoride and from 5 percent to 95 percent of cryolite.

10. In the process of claim 9, wherein said cryolite has alimina dissolved therein: reacting said sulfur with said alumina to form aluminum sulfide, reducing said aliminum sulfide with iron to form aluminum metal, and separating aluminum metal from other materials present.

11. In the process of claim 1, wherein said aluminum halide comprises at least one compound of aluminum and chlorine; and said sulfur halide comprises at least one compound of sulfur and chlorine.

12. In the process of claim 11, wherein said aluminum is separated by volatilization of at least most of the other components remaining after said reaction away from said aluminum.

13. In the process of claim 11, wherein said reaction occurs in said reactor in liquid $AlCl_3$ to which is added a fluid phase of sulfur.

14. In the process of claim 11, wherein said reaction occurs in a liquid phase of aluminum chloride maintained at a temperature and a pressure above those at its triple point.

15. In the process of claim 11, wherein said reaction takes place at least in part, in a liquid phase comprising $AlCl_3$ and from 5 to 95 percent of an added chloride of at least one of the alkaline metals.

16. In the process of claim 11, wherein at least part of said reaction is conducted in the gas phase.

17. In the process of claim 16, wherein the products of said reaction are cooled to the boiling temperature of said compound of aluminum and chlorine under the pressure of said reaction in not more than 5 seconds.

18. The process of producing aluminum metal from an alumina-containing material by steps comprising:
   a. halogenating at a temperature above 1500°C by means of a sulfur halide in the presence of carbon of at least a part of said alumina in said alumina-containing material to produce an aluminum monohalide in a gas stream;
   b. disproportionating said aluminum monohalide to metallic aluminum trihalide by cooling said gas stream to a temperature below 1000°C in not more than 5 seconds; and
   c. separating said aluminum metal, 19. In the process of claim 18, wherein said halogenation is a fluorination, said sulfur halide is a sulfur fluoride, said halogenation of at least part of said alumina gives aluminum monofluoride, and some other part of said aluminum in said alumina is converted to aluminum trifluoride.

20. In the process of claim 18, wherein said halogenation is a chlorination, said sulfur halide is a sulfur chloride, at least part of the aluminum in said alumina which is halogenated becomes aluminum monochloride, and said disproportionation gives aluminum metal and aluminum trichloride.

21. The process of producing aluminum metal from an alumina-containing material by steps comprising:
   a. halogenating by means of a sulfur halide at least a part of said alumina in said alumina-containing material to produce an aluminum halide and elemental sulfur;
   b. charging said aluminum halide and elemental sulfur into a reactor;
   c. reacting in said reactor said aluminum halide with said sulfur in a fluid phase to form aluminum metal and a sulfur halide; and
   d. separating said aluminum metal from said sulfur halide and any excess of said reactants.

22. In the process of claim 21, wherein oxygen is present during said halogenation.

23. In the process of claim 21, wherein the products of said halogenation are cooled, by boiling said aluminum halide at the pressure of said halogenation, to the temperature of said boiling aluminum halide in not more than 5 seconds.

24. In the process of claim 21, wherein said halogenation is a fluorination of said alumina dissolved in cryolite, said aluminum halide formed is an aluminum fluoride, said aluminum fluoride is reacted with sulfur while dissolved in said cryolite; and said aluminum metal so formed is separated from said cryolite.

25. In the process of claim 21, wherein a solid reductant is present during said halogenation.

26. In the process claim 25, wherein said aluminum halide is aluminum chloride, said halogenation is a chlorination, and said sulfur halide is a sulfur chloride.

27. In the process of claim 26, reacting said alumina with at least some part of the sulfur formed during said chlorination reaction to give aluminum sulfide.

28. In the process of claim 27, reducing said aluminum sulfide so formed by iron to give aluminum metal and an iron sulfide.

* * * * *